US011130866B2

(12) United States Patent
Edwards et al.

(10) Patent No.: US 11,130,866 B2
(45) Date of Patent: Sep. 28, 2021

(54) TITANIUM DIOXIDE PRODUCT

(71) Applicant: VENATOR MATERIALS UK LIMITED, Stockton-On-Tees (GB)

(72) Inventors: John Lalande Edwards, Durham (GB); John Robb, Stockton-On-Tees (GB); John Temperley, Stockton On Tees (GB); Russell Mark Evans, Northallerton (GB)

(73) Assignee: VENATOR MATERIALS UK LIMITED, Stockton-on-Tees (GB)

( * ) Notice: Subject to any disclaimer, the term of this patent is extended or adjusted under 35 U.S.C. 154(b) by 146 days.

(21) Appl. No.: 16/307,942

(22) PCT Filed: Jun. 9, 2017

(86) PCT No.: PCT/GB2017/051678
§ 371 (c)(1),
(2) Date: Dec. 7, 2018

(87) PCT Pub. No.: WO2017/212286
PCT Pub. Date: Dec. 14, 2017

(65) Prior Publication Data
US 2019/0218398 A1    Jul. 18, 2019

(30) Foreign Application Priority Data

Jun. 10, 2016   (GB) .................... 1610194

(51) Int. Cl.
*C09C 1/36* (2006.01)
*C09D 5/00* (2006.01)
(Continued)

(52) U.S. Cl.
CPC ............ *C09C 1/3607* (2013.01); *C01G 23/08* (2013.01); *C08K 3/013* (2018.01); *C08K 3/22* (2013.01);
(Continued)

(58) Field of Classification Search
CPC ...... C01G 23/047; C01G 23/00; C01G 23/08; C09C 2200/301; C09C 2200/302;
(Continued)

(56) References Cited

U.S. PATENT DOCUMENTS

2005/0228112 A1    10/2005   Takahashi et al.
2011/0041726 A1*   2/2011    Robb ..................... C09D 7/68
                                                      106/31.13
(Continued)

FOREIGN PATENT DOCUMENTS

EP    0 779 243 A1    6/1997
GB    2 276 157 A     9/1994
(Continued)

*Primary Examiner* — Karl E Group
*Assistant Examiner* — Cameron K Miller
(74) *Attorney, Agent, or Firm* — Norman B. Thot

(57) ABSTRACT

A pigmentary particulate material selected from the group consisting of titanium dioxide, doped titanium dioxide, and a mixture of titanium dioxide and doped titanium dioxide. The pigmentary particulate material has a mean crystal size of from 0.3 to 0.5 microns, a crystal size distribution such that ≥40 wt.-% of the pigmentary particulate material has a crystal size of from 0.3 to 0.5 microns, and a ratio of a mean particle size to the mean crystal size of ≤1.25.

20 Claims, 5 Drawing Sheets

(51) Int. Cl.
*C09D 11/037* (2014.01)
*C09D 7/40* (2018.01)
*C08K 3/013* (2018.01)
*C01G 23/08* (2006.01)
*C08K 3/22* (2006.01)
*C09D 11/101* (2014.01)

(52) U.S. Cl.
CPC ............... *C09D 5/002* (2013.01); *C09D 7/68* (2018.01); *C09D 11/037* (2013.01); *C09D 11/101* (2013.01); *C01P 2002/60* (2013.01); *C01P 2002/90* (2013.01); *C01P 2004/51* (2013.01); *C01P 2004/62* (2013.01); *C01P 2006/60* (2013.01); *C08K 2003/2241* (2013.01)

(58) Field of Classification Search
CPC ......... C09C 1/36; C09C 1/0084; C09C 3/063; C09C 1/3607; C08K 3/22; C08K 2003/2237; C08K 2003/2241; C08K 3/013; C09D 11/037; C09D 11/322; C09D 11/101; C09D 17/008; C09D 5/035; C09D 7/67; C09D 7/68; C09D 5/002; C01P 2002/60; C01P 2002/90; C01P 2004/51; C01P 2004/62; C01P 2006/60

See application file for complete search history.

(56) References Cited

U.S. PATENT DOCUMENTS

| | | |
|---|---|---|
| 2012/0305865 A1 | 12/2012 | Edwards et al. |
| 2013/0048925 A1 | 2/2013 | Edwards et al. |
| 2014/0073729 A1 | 3/2014 | Schmidt et al. |

FOREIGN PATENT DOCUMENTS

| | | | | |
|---|---|---|---|---|
| GB | 2 308 118 A | | 6/1997 | |
| GB | 2308118 A | * | 6/1997 | ............. C01G 23/08 |
| GB | 2 322 366 A | | 8/1998 | |
| GB | 2477930 A | | 8/2011 | |
| GB | 2477931 A | | 8/2011 | |
| JP | H09-188518 A | | 7/1997 | |
| JP | H09-278442 A | | 10/1997 | |
| TW | 200404045 A | | 3/2004 | |
| TW | I456010 B | | 10/2014 | |
| WO | WO 2009/136141 A1 | | 11/2009 | |
| WO | WO 2009/136141 A8 | | 11/2009 | |

* cited by examiner

TITANIUM DIOXIDE PRODUCT

CROSS REFERENCE TO PRIOR APPLICATIONS

This application is a U.S. National Phase application under 35 U.S.C. § 371 of International Application No. PCT/GB2017/051678, filed on Jun. 9, 2017 and which claims benefit to Great Britain Patent Application No. 1610194.1, filed on Jun. 10, 2016. The International Application was published in English on Dec. 14, 2017 as WO 2017/212286 A1 under PCT Article 21(2).

FIELD

The present invention relates, in general, to titania particles and to their use, especially in thin films.

BACKGROUND

Titanium dioxide ($TiO_2$) is commonly viewed as being the principal white pigment in commerce. It has an exceptionally high refractive index, negligible color and is also inert. Titanium dioxide is generally present in the market place in either of two predominant polymorphs, anatase or rutile. Rutile is the desired form for the majority of commercial applications.

Titanium dioxide is well known as being useful as an opacifier in paints, paper, plastics, ceramic, inks, etc.

There are two main processes for making raw pigmentary titanium dioxide: the sulfate process and the chloride process. The sulfate process is based on the digestion of ilmenite or titania slag in concentrated sulfuric acid. After iron removal as iron sulfate, the solution is heated and diluted with water. The titanium hydrolyzes, forming a titanium oxysulfate precipitate, which is further treated to produce $TiO_2$ pigment. The chloride process relies on the carbo-chlorination of low-iron, titanium containing ore or intermediate products to form $TiCl_4$, followed by the gas phase oxidation of $TiCl_4$.

Titanium dioxide can be flocculated and/or precipitated out of a titanium dioxide containing dispersion by pH adjustment of the dispersion. The finishing process for titanium dioxide, as obtained by any known method, may include one or more of: dry milling, wet milling, classification, filtering, washing, drying, steam micronizing and packaging. In a commercial process, the titanium dioxide dispersion will generally always be milled and micronized to achieve a desired particle size distribution.

Conventional rutile $TiO_2$ has an average (mean) crystal size of from 0.17 μm to 0.29 μm, whilst conventional anatase $TiO_2$ has an average (mean) crystal size of from 0.10 μm to 0.25 μm.

Crystal size is distinct from particle size. The particle size depends on the effectiveness of the dispersion of the pigment in the system within which it is used.

Particle size is determined by factors such as crystal size and milling techniques, e.g., dry, wet or incorporative milling. The particle size of conventional rutile $TiO_2$ is from 0.25 μm to 0.35 μm, whilst conventional anatase $TiO_2$ has a particle size of from 0.15 μm to 0.30 μm. Larger particle sizes can result if the techniques used are such that crystals "clump" together.

Titanium dioxide, as sold commercially, generally has a mean particle size of 150 nm to 350 nm (0.15 μm to 0.35 μm).

For most paints, it is conventionally accepted that the mean particle size (which can be determined using a Brookhaven BI-XDC X-ray Disc Centrifuge System) should lie in the range of from 0.29 μm to 0.32 μm, with a geometric standard deviation of less than 1.45. As the skilled person will appreciate, the particle size distribution is modelled as a lognormal distribution. The same applies to the crystal size distribution.

The particle size distribution measurement can be determined using a Brookhaven BI-XDC X-ray Disc Centrifuge System (XDC) as follows: dried $TiO_2$ material (0.92 g) is mixed with 0.625 gpl sodium silicate solution (16.80 g) and de-ionized water (5.28 g) in a Bosch mill pot to give a dilute suspension of ~4% solids. The pH is adjusted to between 10 and 10.5 with two drops of sodium hydroxide solution (20 gpl). Samples are then vigorously milled for 10 minutes using a Bosch high-speed impeller. This method is designed to be representative of the mechanical energy used in the production of most paint and inks.

As noted above, $TiO_2$ crystal size distribution and particle size distribution tend to be lognormal in nature. As contrasted with a normal distribution of values, where the distribution curve would be symmetrical, a lognormal distribution has a distribution curve with a long tail on the large side. However, for such a lognormal distribution, if the frequency of particles is plotted against the log of the size, a symmetrical distribution curve is obtained. Normal distributions are characterized by an arithmetic weight standard deviation, whereby 68 wt.-% of the crystals/particles lie between 'Mean+1 standard deviation' and 'Mean−1 standard deviation'. In contrast, lognormal distributions are characterized by a geometric weight standard deviation (GWSD), whereby 68 wt.-% of the crystals/particles lie between 'Mean×1 standard deviation' and 'Mean/1 standard deviation'.

Conventional pigmentary rutile $TiO_2$ as used in commercial applications has a mean crystal size around 0.25 μm because it is generally accepted in the art that this is optimal for characteristics such as opacity and whiteness. Opacity is the result of scattering of all wavelengths of incident light and the accepted choice of crystal size is based on the belief that the most efficient scattering of a given wavelength of light occurs when $TiO_2$ is used having a crystal size half that of the light's wavelength.

For example, US 2014/073729 describes that, "According to the Mie theory, electromagnetic radiation is optimally reflected by particles with a particle size corresponding to half the wavelength of the electromagnetic radiation. Pigmentary titanium dioxide particles thus have a particle size distribution of roughly 0.2 to 0.4 μm, corresponding to half the wavelength of visible light (380 to 780 nm)."

Accordingly, for example, a mean particle size of 0.25 μm would normally be seen as the choice to optimally scatter visible light at 500 nm (where the maximum radiation intensity of the solar spectrum occurs).

Material with a mean crystal size of 0.25 μm typically has a high proportion of crystals within the 0.20-0.30 μm range. In general, 68 wt.-% (i.e., the mean±one geometric weight standard deviation) of the crystals lie in the size range of from 0.19 μm to 0.33 μm. The crystal size distribution can be determined by image analysis of electron micrographs of the crystals.

Examples of the use of pigmentary titania can be found in the prior art. For example, GB 2 322 366 describes anatase titania having improved pigmentary properties; the titania has a mean crystal size greater than 0.2 and less than 0.28 μm whilst the geometric weight standard deviation of the crystal size is generally in the range 1.30 to 1.50. EP 0 779 243 describes a process for producing rutile titania particles with good optical efficiency which have a narrow size distribution for the particles (which comprise one or more crystals). The particles are described as having a mean crystal size in the range of from 0.17 µm to 0.32 µm; the preferred mean crystal size is from 0.22 µm to 0.26 µm. GB 2 276 157 describes anatase titania particles having improved pigmentary properties, where at least 90% have a mean crystal size within the range of 0.20-0.30 µm and a geometric weight standard deviation of 1.31-1.35.

In applications involving thin films, such as printing inks, mean crystal sizes of 0.25 µm are still used, but because thin films provide a greater challenge to achieve successful hiding, very narrow crystal size distributions are normal, e.g., such that 68 wt.-% of crystals in such pigments lie in the range of from 0.20 to 0.31 µm. High concentrations of titania are normally required in such films to achieve sufficient opacity for good coverage.

The use of large crystal size titania material is also known. One example of such a product is R-38L, marketed by Sakai Chemical Industry Co. for high infrared reflection, which has a mean crystal size of 0.56 µm when measured by image analysis of a TEM (Transmission Electron Microscope) micrograph. The percentage (by weight) of R-38L crystals in the range 0.308-0.508 µm is 29.45% when measured by image analysis of a TEM micrograph.

WO 2009/136141 describes NIR (near-infrared) scattering particulate material which is required to have a mean crystal size of greater than 0.40 µm and a particle size distribution such that 30% or more of the particles are less than 1 µm; preferably the NIR scattering particulate material has a mean crystal size of greater than 0.40 µm and up to 1.20 µm, e.g., from 0.45 to 1.1 µm, more preferably from 0.50 to 1.1 µm, such as from 0.60 to 1.0 µm, e.g., from 0.70 to 1.0 µm. The large crystal $TiO_2$ products used in WO2009/136141 include rutile titania with a mean crystal size of 0.79 and a geometric weight standard deviation of 1.38. This material improves the durability and/or lifetime of a product that is exposed to the sun during use.

GB 2 477 930 describes the use of rutile titania having a mean particle size of between 0.5 µm and 2.0 µm, more preferably between 0.7 µm and 1.4 µm, in a colored solar-reflective system. The crystal size is not described. The titanium dioxide useful in GB 2 477 930 is stated as being one capable of scattering near-infrared light (NIR) while also providing low scattering and low absorbance of visible light.

GB 2 477 931 describes the use of an effect coated particulate material having a substantially rutile crystal habit and a mean particle size greater than or equal to 0.5 µm. This material, which may be rutile titania, is used in a medium at a concentration of 1 to 20% by volume to provide a UV-screening composition. The composition provides UV light (300-400 nm) protection for a substrate without also increasing UV light activated photocatalytic effects which are observed for some titanium dioxide compositions.

GB 2 477 931 also refers to the Huntsman titania product TR60®. For this product, the measured crystal sizes are in the range 0.240-0.248; 21.1% of crystals had sizes in the range 0.30-0.50 µm, on average; and the measured particle size: crystal size ratios are in the range 1.254-1.510.

In titania-containing products such as printing inks, primer coatings for metal (such as in coil coating processes) and plastic films (e.g., for packaging, and especially food packaging), it is required that the thickness of the product be kept low, i.e., for the product to be a thin film. There is an ongoing desire to have ever thinner films in order to make the product more lightweight and to reduce the amount of materials used, giving the benefits of reduced costs and improved environmental credentials. This must, however, be balanced with the need for good hiding power to ensure that the background does not show through the coating. There is therefore a limit to how thin a film can be made whilst providing sufficient opacity for successful hiding of background color arising from the underlying substrate.

Thin films with high loading of $TiO_2$ are also beneficial in applications where transmission must be attenuated or diffused (such as attenuating film in greenhouses and diffusers on light fittings or backlit displays).

SUMMARY

In an embodiment, the present invention provides a pigmentary particulate material which is selected from the group consisting of titanium dioxide, doped titanium dioxide, and a mixture of titanium dioxide and doped titanium dioxide. The pigmentary particulate material has a mean crystal size of from 0.3 to 0.5 µm, a crystal size distribution such that ≥40 wt.-% of the pigmentary particulate material has a crystal size of from 0.3 to 0.5 µm, and a ratio of a mean particle size to the mean crystal size of <1.25.

BRIEF DESCRIPTION OF THE DRAWINGS

The present invention is described in greater detail below on the basis of embodiments and of the drawings in which.

DETAILED DESCRIPTION

Figure 1:
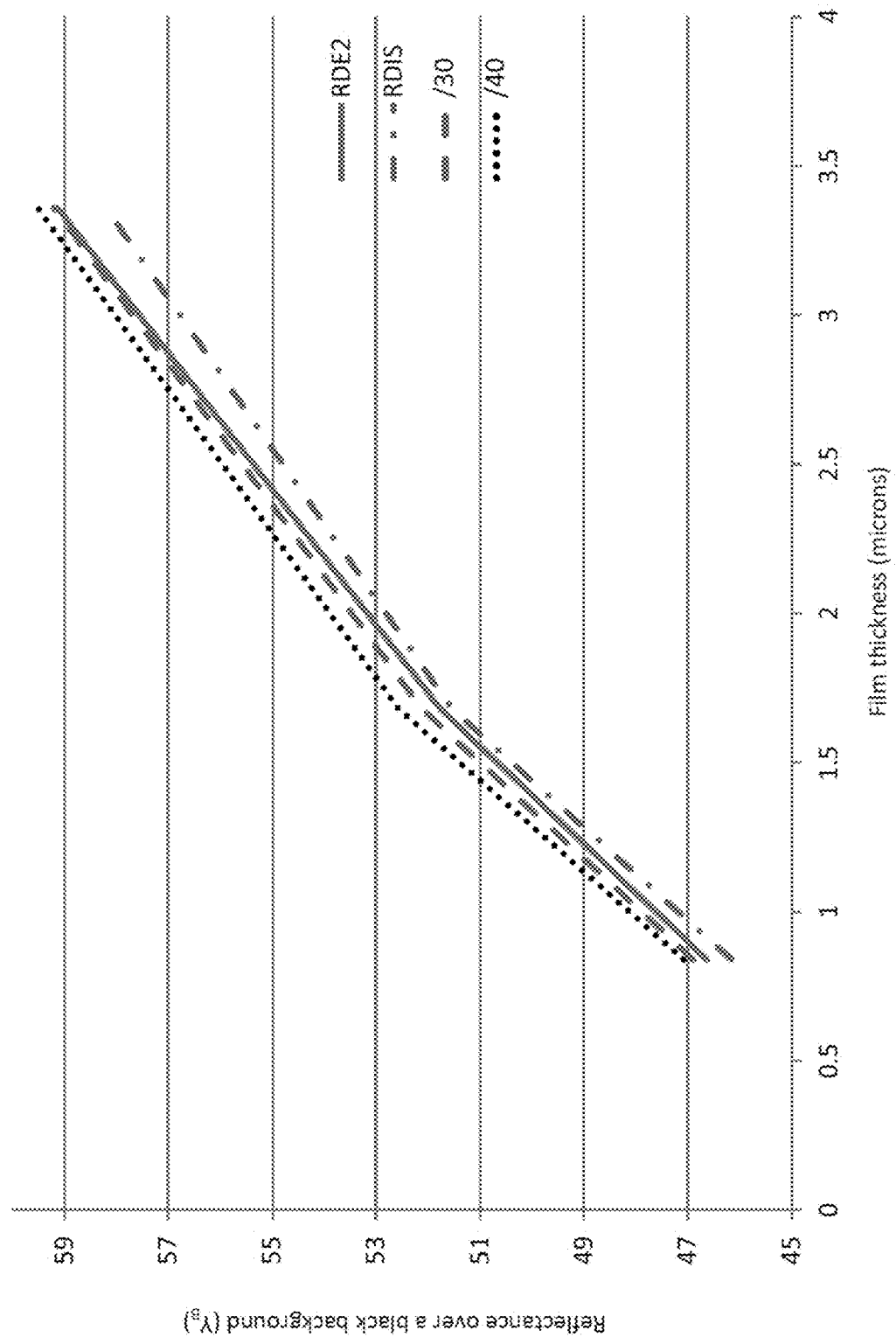
FIG. 1 is a graph showing the Y(B) (reflectance over black) results at 550 nm for two white ink films containing titania particle material according to the present invention and for two white ink films containing conventional titania particle material.

The present invention provides, in a first aspect, a pigmentary particulate material selected from the group consisting of titanium dioxide, doped titanium dioxide and a mixture thereof, wherein the particulate material has a mean crystal size in the range of from 0.3 to 0.5 µm and a crystal size distribution such that 40 wt.-% or more of the particulate material has a crystal size in the range of from 0.3 to 0.5 µm, and wherein the ratio of the mean particle size to the mean crystal size is 1.25 or less.

In an embodiment, the particulate material has a mean crystal size in the range of from 0.35 to 0.5 μm and a crystal size distribution such that 40 wt.-% or more of the particulate material has a crystal size in the range of from 0.3 to 0.5 μm.

In an embodiment, the particulate material has a mean crystal size in the range of from 0.4 to 0.5 μm and a crystal size distribution such that 40 wt.-% or more of the particulate material has a crystal size in the range of from 0.3 to 0.5 μm.

It has surprisingly been determined that the material of the first aspect can be used to provide improved opacity as compared to conventional pigmentary titania material. Such material can also be used to provide improved lightness as compared to conventional pigmentary titania material. This can be seen in the Examples.

For example, an improvement in opacity of about 10% can be obtained for thin films (e.g., thin layers of paints or inks) containing the material of the first aspect as compared to thin films containing conventional pigmentary titania. This can be seen in the Examples.

This is therefore contrary to the conventional wisdom that the optimal size of $TiO_2$ is a crystal size that is equal to half the wavelength of light to be scattered. Weber's Rule suggests that the optimum $TiO_2$ size should be half the wavelength of light, and thus about 0.275 μm for 550 nm green solar light. It would not have been predicted that by using titania having a mean crystal size significantly higher than 0.275 μm, and using an overall distribution that moves the crystal sizes away from that size that was perceived as optimal, a product would be obtained that was even equivalent to conventional material, let alone better.

Typical tolerance in the production of $TiO_2$ pigments is +/−0.005 μm. Therefore an increase in crystal size from 0.275 μm to 0.3 μm and above is significant.

The present invention determined that by having a mean crystal size range larger than standard pigmentary sizes, namely in the range of from 0.3 to 0.5 μm, and by having a specific controlled distribution of the crystal sizes away from standard pigmentary sizes, such that 40 wt.-% or more of the particulate material has a crystal size in the range of from 0.3 to 0.5 μm, technically beneficial properties are achieved. Thin films containing such titania material have been shown to have excellent opacity and lightness.

An improvement in opacity of 10% as compared to using conventional pigmentary titania material is significant, as it provides the option to be able to hide substrates that previously were challenging to cover but also provides the alternative option to achieve the same opacity whilst using less coating composition, therefore reducing costs and providing environmental benefits.

In this regard, the material of the first aspect can be used to provide coating compositions having improved opacity and/or lightness for a given thickness of film and concentration of $TiO_2$ in the composition. The film can thus be made thinner and/or can use less titania without compromising on the opacity. This leads to the film being more lightweight and to reduced quantities of materials being required, giving an associated cost saving as well as an environmental benefit.

The film could alternatively be used at the same thickness but with improved properties in terms of opacity and/or lightness. This could be useful for end uses where the underlying substrate has a strong or dark color, or a reflective surface, and therefore improved opacity will enhance the hiding properties of the film, to mask that underlying color/reflectance.

The use of particles with a ratio of the mean particle size to the mean crystal size being 1.25 or less is important to ensure that the particles can be utilized in thin films. Products with larger ratios would not be suitable for formulation into the thin films envisaged for use in the present invention.

As the skilled person will appreciate, a particle size (micron/μm): crystal size (micron/μm) ratio of 1.25 indicates that the "diameter" of each particle is 25% larger than the crystal. This means that the particle volume is $(1.25)^3$ times bigger, i.e., approximately two times bigger, than the crystal volume. In other words, at this ratio there are, on average, two crystals per particle. Going beyond this ratio of the present invention therefore results in particles that extend in two or three dimensions. It can be appreciated by the skilled reader that, conceptually, having particle volumes that are more than twice as big as the crystal volumes means that there is difficulty in efficiently close-packing irregular shapes.

The particles according to the present invention can be closely packed together. The particles according to the present invention can be successfully used in thin films. It has surprisingly been found that the use of close packing is not detrimental to the visible light scattering in the present invention, contrary to the previously held belief in the art. The specific claimed form of titania gives improved opacity for film compositions.

Having particle volumes that are more than twice as big as the crystal volumes would also potentially result in surface roughness, which would impair appearance (gloss) of surface inks.

It is therefore technically beneficial in the present invention to have a ratio of the mean particle size to the mean crystal size that is 1.25 or less.

The present invention has identified that the specific claimed form of titania, in terms of mean crystal size, size distribution, and particle size to crystal size ratio, gives improved opacity for film compositions. This has in particular been evidenced in compositions using high concentrations of $TiO_2$ (30 vol.-% or more).

It is important in the present invention that there is control in respect of both the mean crystal size and the polydispersity (the distribution of crystal sizes), as well as in relation to the ratio of particle size to crystal size.

It is surprising that these larger crystal sizes and distributions that move away from those in pigmentary products have been found to be not only acceptable but are in fact optimal for scattering visible light when provided in thin films with relatively high titania concentrations.

Conventionally, $TiO_2$ pigments with a crystal size in the range 0.10-0.29 μm (for example, 0.23-0.27 μm) have been found to have utility for reflecting light in the visible region. Titania with a mean crystal size in the range beyond 0.30 μm has generally been considered to be unsuitable for reflecting visible light. The motivation to produce material in this higher size range has been driven by a need to reflect near-infrared radiation (thermal management).

The key previous uses of larger crystal titania were thus in relation to NIR (near-infrared) scattering. Some utility was also found in providing UV light (300-400 nm) protection.

As the skilled person will appreciate, the solar spectrum is wide and a narrow distribution would be at odds with the requirement to reflect a wide range of wavelengths.

Surprisingly, in the present invention, the use of (i) a relatively large crystal size, namely a mean crystal size in the range of from 0.3 to 0.5 μm, in combination with (ii) a relatively narrow distribution, namely a crystal size distribution such that 40 wt.-% or more of the particulate material has a crystal size in the range of from 0.3 to 0.5 µm, and in further combination with (iii) a relatively low ratio of mean particle size to mean crystal size, namely 1.25 or less, gives rise to surprisingly good scattering of visible light, meaning that a coating composition with good opacity and lightness can be produced. This can in particular be used to produce thin films.

The present invention thus also provides, in a second aspect, a composition containing the particulate material of the first aspect dispersed within a vehicle. The vehicle may, for example, comprise a resin and/or binder.

The composition may, in one embodiment, be an ink (such as a printing ink), a paint, a primer coating for metal (such as for use in a coil coating process) or a thin plastic film (e.g., for packaging).

The composition may include titania in an amount of 30 vol.-% or more, or 35 vol.-% or more, such as 40 vol.-% or more, e.g., from 40 to 75 vol.-%. This compares with conventional coating composition where concentrations of 10 vol.-% for the $TiO_2$ material are common. The effect of optimal scattering of visible light has been particularly found in compositions with titania loadings of 30 vol.-% or more.

In general, the particulate material of the first aspect is particularly beneficial when used in thin films, especially films that are 20 µm thick or less, such as 15 µm thick or less, or 10 µm thick or less, for example, 5 µm thick or less. Such films require high concentrations of $TiO_2$ in order to achieve sufficient opacity and thus for there to be good hiding power.

The present invention therefore also provides, in a third aspect, a film formed from a composition of the second aspect, wherein the film has a thickness of 20 µm or less, such as 15 µm or less, or 10 µm or less, for example, 5 µm or less. Thin film thickness can be measured using techniques known in the art such as ellipsometry.

The end uses of the particulate material of the first aspect include inks (such as printing inks), paints, primer coatings for metal (such as in coil coating processes) and thin plastic films (e.g., for packaging).

The particulate material of the first aspect may, however, also be utilized in other applications where pigmentary titania is commonly utilized, e.g., white solar reflective coatings, plastic components and roof shingle applications.

In a fourth aspect of the present invention, there is provided a product which comprises a substrate that is at least partially covered with a composition of the second aspect or a film of the third aspect. It may be that the composition or film is an ink, a primer coating or a plastic film, and thus in one embodiment the product comprises a substrate that is at least partially covered with an ink, a primer coating or a plastic film. For example, the product may have an outer surface and that outer surface may be partially, mostly or completely covered with an ink, a primer coating or a plastic film.

In one embodiment, the substrate has a reflective surface; for example, it may be a metal or a product with a metallized surface. It may be a metal coil, e.g., a steel coil or aluminum coil, or it may be a metal foil. A metal in this context is a metallic element or an alloy.

In one embodiment, the substrate is packaging, e.g., packaging for foodstuffs.

In one embodiment, the substrate may be, or may comprise, a barcode. Having improved lightness for the white portions of a barcode can assist the contrast with the black portions and can assist reading of the bar code by infrared bar-code readers.

A further benefit of the particulate material of the first aspect is that it enables UV curing to be carried out. Conventional rutile $TiO_2$ is very efficient at blocking UV light and therefore inhibits any UV-based curing process. In contrast, the material of the first aspect has increased transmittance at a wide range of UV wavelengths, and UV curing is therefore possible. The material of the first aspect can thus be used in inks that are UV cured.

Therefore, in one embodiment, the composition of the second aspect is a UV-curable ink.

In a fifth aspect, the present invention provides the use of the particulate material of the first aspect in an ink, a paint, a primer coating for metal or a plastic film. It may be that the ink is a printing ink, a security ink, and/or an ink that can be UV cured.

In a sixth aspect, the present invention provides the use of the particulate material of the first aspect as the pigmentary material in a composition comprising pigmentary material dispersed in a vehicle, to provide improved opacity for said composition.

In a seventh aspect, the present invention provides the use of the particulate material of the first aspect as the pigmentary material in a composition comprising pigmentary material dispersed in a vehicle, to permit lower concentrations of the pigmentary material to be used without adversely affecting the opacity for said composition.

In an eighth aspect, the present invention provides the use of the particulate material of the first aspect as the pigmentary material in a composition comprising pigmentary material dispersed in a vehicle, to permit a smaller thickness of the composition to be used as coating on a substrate without adversely affecting the opacity for said composition.

In a ninth aspect, the present invention provides the use of the particulate material of the first aspect as the pigmentary material in a composition comprising pigmentary material dispersed in a vehicle, to obtain a Y(B) opacity value (reflectance over a black background) of 55% or more at 550 nm with a thickness of composition of 3 µm or less. For example, it may be used to obtain a Y(B) opacity value (reflectance over a black background) of 55% or more at 550 nm with a thickness of composition of 2.8 µm or less, or 2.6 µm or less, or 2.4 µm or less.

Figure 2:
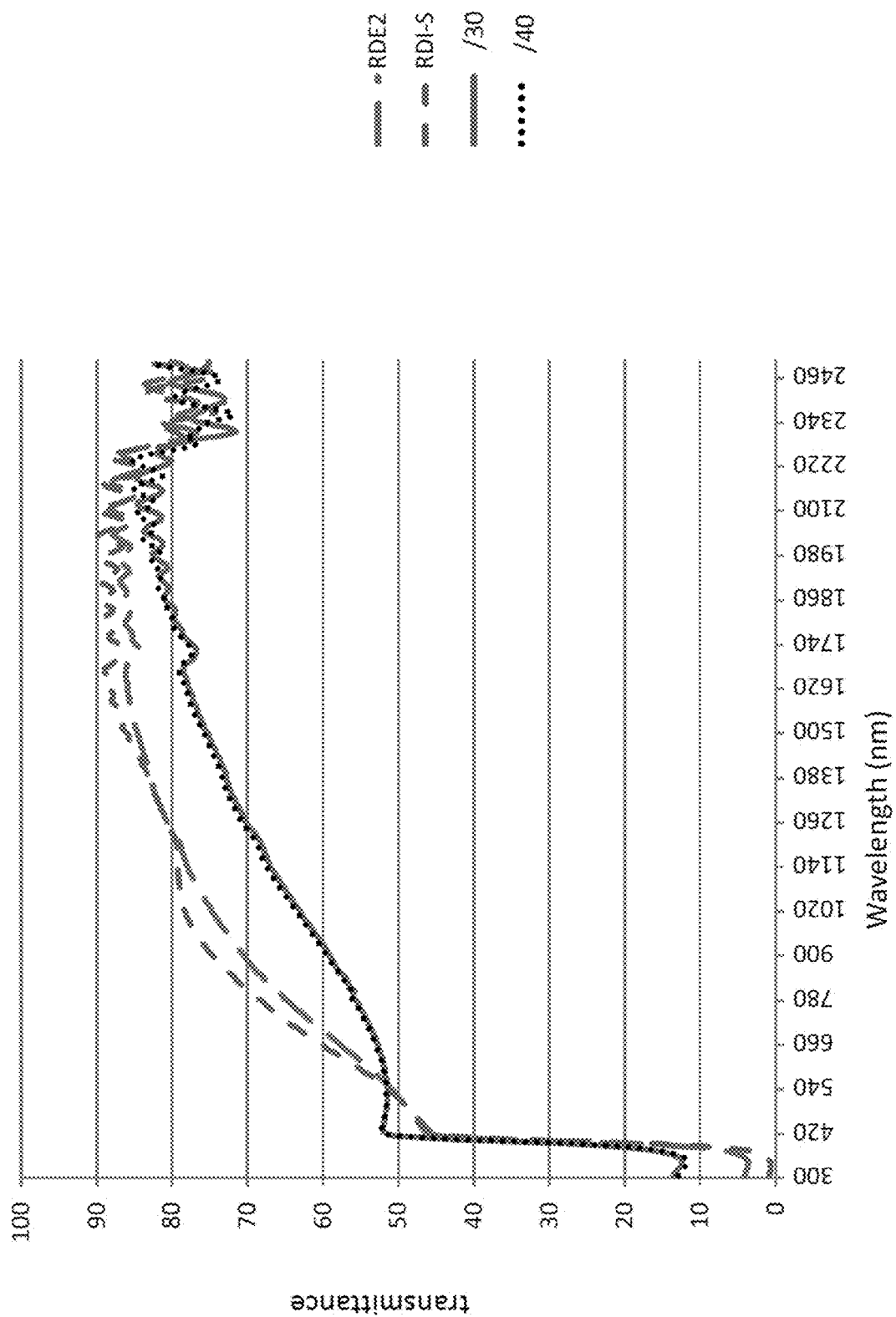
FIG. 2 is a graph showing the transmittance results over a range of wavelengths for two white ink films containing titania particle material according to the present invention and for two white ink films containing conventional titania particle material.
Figure 3:
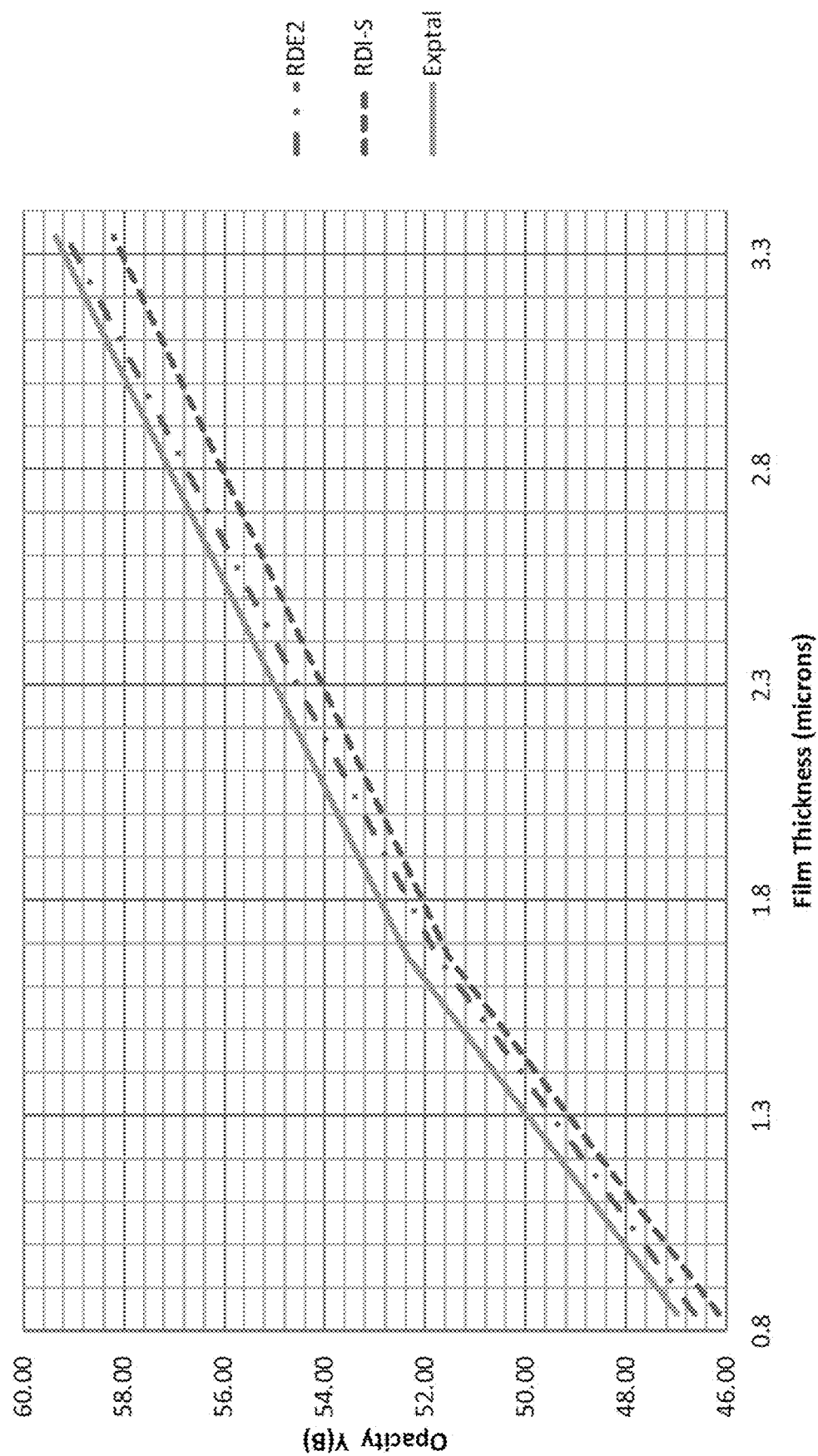
FIG. 3 is a graph showing the Y(B) (reflectance over black) results at 550 nm from FIG. 1 where the results for the two white ink films containing titania particle material according to the present invention are averaged and shown as a single line.

In the graphs of FIGS. 1-3, the skilled person will appreciate that differences between the products according to the disclosure and the prior products in the y-axis direction represent differences in opacity and are therefore indicative of the potential for improved quality by using the present invention, whilst the differences in the x-axis direction represent differences in the amount of materials required and therefore are indicative of the potential for material and cost savings by using the present invention.

The pigmentary particulate material of the present disclosure has a mean crystal size in the range of from 0.3 to 0.5 µm and a crystal size distribution such that 40 wt.-% or more of the particulate material has a crystal size in the range of from 0.3 to 0.5 µm, and the ratio of the mean particle size to the mean crystal size is 1.25 or less. Having a particulate material with this distribution of crystal sizes clustered around a 0.4 µm size gives rise to properties that were not predictable, in particular having improved opacity as compared to particulate material with a mean crystal size around 0.25 µm, which make the material particularly useful in thin films where a strong hiding power is required.

The crystal size distribution for the particulate material is lognormal or approximately log normal in nature.

In one embodiment, the particulate material has a mean crystal size in the range of from 0.35 to 0.5 µm and a crystal size distribution such that 40 wt.-% or more of the particulate material has a crystal size in the range of from 0.3 to 0.5 µm.

In one embodiment, the particulate material has a mean crystal size in the range of from 0.4 to 0.5 µm and a crystal size distribution such that 40 wt.-% or more of the particulate material has a crystal size in the range of from 0.3 to 0.5 µm.

In one embodiment, the crystal size distribution is such that 45 wt.-% or more of the particulate material has a crystal size in the range of from 0.3 to 0.5 µm, such as 50 wt.-% or more. In one embodiment, the crystal size distribution is such that from 40 wt.-% to 95 wt.-% of the particulate material has a crystal size in the range of from 0.3 to 0.5 µm, such as from 45 wt.-% to 90 wt.-% or from 50 wt.-% to 85 wt.-%.

In one embodiment, the crystal size distribution is such that, in addition to 40 wt.-% or more of the particulate material having a crystal size in the range of from 0.3 to 0.5 µm, 50 wt.-% or more of the particulate material has a crystal size less than or equal to 0.6 µm, such as 55 wt.-% or more or 60 wt.-% or more or 70 wt.-% or more, e.g., 75 wt.-% or more or 80 wt.-% or more, e.g., from 50 to 99 wt.-% or from 55 to 95 wt.-% or from 60 to 90 wt.-%.

In one embodiment, the crystal size distribution is such that 45 wt.-% or more of the particulate material has a crystal size less than or equal to 0.5 µm, such as 50 wt.-% or more, e.g., from 45 to 95 wt.-% or from 48 to 90 wt.-% or from 50 to 85 wt.-%.

In one embodiment, the crystal size distribution is such that 0.5 wt.-% or more of the particulate material has a crystal size in the range of from 0.2 to 0.3 µm, such as 1 wt.-% or more or 1.5 wt.-% or more, e.g., 2 wt.-% or more or 3 wt.-% or more or 4 wt.-% or more or 5 wt.-% or more. In one embodiment, the crystal size distribution is such that from 0.5 wt.-% to 40 wt.-% of the particulate material has a crystal size in the range of from 0.2 to 0.3 µm, such as from 1 wt.-% to 30 wt.-% or from 1.5 wt.-% to 25 wt.-% or from 2 wt.-% to 20 wt.-%.

In one embodiment, the crystal size distribution is such that 50 wt.-% or more of the particulate material has a crystal size in the range of from 0.29 to 0.56 µm, such as 60 wt.-% or more or 65 wt.-% or more. In one embodiment, the crystal size distribution is such that 68 wt.-% or more of the particulate material has a crystal size in the range of from 0.29 to 0.56 µm.

It is important in the present invention that there is control in respect of both the mean crystal size and the polydispersity (the distribution of crystal sizes), as well as in relation to the ratio of particle size to crystal size. It is the control of all three factors that leads to material which has surprisingly effective visible light scattering, especially in thin films with concentrations of 30 vol.-% or more titania.

The skilled person will be aware that in the present technical field, the average particle size is determined by calculating the geometric mean.

As one skilled in the art is aware, crystal size is distinct from particle size. Crystal size relates to the size of the fundamental crystals which make up the particulate material. These crystals may then aggregate to some degree to form larger particles. In the present invention, the mean particle size is close to the mean crystal size, with the ratio of the mean particle size to the mean crystal size being 1.25 or less.

In one embodiment, the ratio of the mean particle size to the mean crystal size may be from 1.0 to 1.25. In one embodiment, the ratio of the mean particle size to the mean crystal size is from 1.0 to 1.2, or from 1.0 to 1.15, or from 1.1 to 1.2, or from 1.1 to 1.15.

Where both the particle size and crystal size are measured simultaneously, the particle size should be greater than the crystal size. In one embodiment, the ratio of the mean particle size to the mean crystal size is greater than 1.0 and up to 1.25.

The crystal size and particle size of the titanium dioxide may be determined by methods well known to those skilled in the art. For example, the crystal size may be determined by transmission electron microscopy (TEM) on a rubbed out sample with image analysis of the resulting photograph. The results of the crystal size may further be validated by reference using latex NANOSPHERE™ Size Standards (available from Thermo Scientific). A method which may be used for determining the particle size of the titanium dioxide is X-ray sedimentation. The crystal size distribution can be determined by image analysis of electron micrographs of the crystals.

The titanium dioxide of the present disclosure may be white or translucent. The titanium dioxide can, for example, be white. In one embodiment, the titanium dioxide thus has a lightness value $L^*$ (CIE $L^*a^*b^*$ color space) greater than 95, an $a^*$ value less than 5 and a $b^*$ value less than 5.

The titanium dioxide used in the present invention may be produced by the sulfate process, fluoride process, hydrothermal processes, aerosol processes, leaching processes, or chloride process. In one embodiment, it is produced by the sulfate process or the chloride process.

The titanium dioxide may be in either the rutile or anatase crystal form. In the present invention, the rutile crystal form may be used because of its higher refractive index. In one embodiment, the titanium dioxide is 50% or more by weight rutile, such as 60 wt.-% or more, e.g., 70 wt.-% or more, for example, 80 wt.-% or more, for example, 90 wt.-% or more, for example, 95 wt.-% or more, such as 99 wt.-% or more, for example, 99.5 wt.-% or more.

The titanium dioxide may include impurities, e.g., up to a level of 20 wt.-%, especially 15 wt.-% or less, or 10 wt.-% or less; such as 8 wt.-% or less, e.g., 5 wt.-% or less. These impurities result from incomplete purification and may, for example, be iron, silica, niobia or other impurities typically present in titanium dioxide bearing feedstocks. In one embodiment, the titanium dioxide may include impurities up to a level of 0.5 wt.-% or less, such as 0.1 wt.-% or less, e.g., 0.01 wt.-% or less; these impurities may, for example, be iron, phosphorous, niobia or other impurities typically present in titanium dioxide bearing feedstocks.

The titanium dioxide can, for example, have a $TiO_2$ content of 90 wt.-% or higher, such as 92 wt.-% or higher, for example, 93 wt.-% or higher. The titanium dioxide can, for example, have a $TiO_2$ content of 95 wt.-% or higher, such as 99 wt.-% or higher, for example, 99.5 wt.-% or higher.

In one embodiment, the particulate material is titanium dioxide. In another embodiment, the particulate material is doped titanium dioxide or a combination of titanium dioxide with doped titanium dioxide. As the skilled reader will appreciate, doped titanium dioxide has one or more dopants incorporated during the preparation of the titanium dioxide. The dopants, which may be incorporated by known processes, may include, but are not limited to, calcium, magnesium, sodium, vanadium, chromium, nickel, aluminum, antimony, niobium, phosphorus, or cesium. The dopant may be incorporated in an amount of no more than 30% by weight, for example, no more than 15% by weight, and, for example, no more than 5% by weight, based on the total weight of the titanium dioxide. For example, the dopant may be incorporated in an amount of from 0.1 to 30% by weight, or 0.5 to 15% by weight, or 1 to 5% by weight, relative to the total weight of the titanium dioxide.

The doped titanium dioxide may be in either the rutile or anatase crystal form. The doped titanium dioxide can, for example, possess the rutile crystal structure. As the skilled person will appreciate, this does not necessarily mean that the doped titanium dioxide is rutile, but can be material which is iso-structural with rutile.

In one embodiment, the particulate material may be treated with a coating agent to form coated titanium dioxide or coated doped titanium dioxide. Coating of titania is known in the art.

As noted above, the crystal size can be determined using electron microscopy. When using this technique, a view that contains sufficient crystals involves a lower magnification than that needed to observe most coatings. For example, a 5 wt.-% coating would only be about 0.01 µm thick. Heavy coatings would appear as low contrast haloes around crystals. Therefore, when assessing crystal size via electron microscopy, where coatings are observed, they should be ignored. Crystal sizing should be based on the crystals (high contrast areas) without the coating.

Coating agents suitable for use include those commonly used to coat an inorganic oxide or hydrous oxide onto the surface of particles. Typical inorganic oxides and hydrous oxides include one or more oxides and/or hydrous oxides of silicon, aluminum, titanium, zirconium, magnesium, zinc, cerium, phosphorus, or tin, for example, $Al_2O_3$, $SiO_2$, $ZrO_2$, $CeO_2$, $P_2O_5$, sodium silicate, potassium silicate, sodium aluminate, aluminum chloride, aluminum sulfate or a mixture thereof. The amount of coating coated onto the surface of the titanium dioxide or doped titanium dioxide may range from about 0.1% by weight to about 20% by weight of the inorganic oxide and/or hydrous oxide relative to the total weight of the titanium dioxide or doped titanium dioxide.

Organic surface treatments may optionally be applied at the milling stage of producing the titanium dioxide. These include treatment with polyols, amines, alkyl phosphonic acids and/or silicone derivatives. For example, the organic surface treatment may be with trimethylolpropane, pentaerythritol, triethanolamine, n-octyl phosphonic acid or trimethylolethane.

In one embodiment, the particulate material may be treated to selectively remove particular size fractions. For example, any particles which are 5 µm in diameter or greater may be removed, for example, in one embodiment, any particles which are 3 µm in diameter or greater may be removed or any particles which are 1 µm in diameter or greater may be removed. Such particles may be removed, for example, via a centrifugation treatment.

The present disclosure also provides a composition containing the particulate material of the present invention dispersed within a vehicle. The vehicle may be any component or combination of components within which the material can be dispersed. The amount of particulate material is suitably from 0.5% by volume to about 75% by volume of particulate material, based on the total volume of the composition.

In one embodiment, the composition is for application as a thin film and includes 30 vol.-% or more particulate material, based on the total volume of the composition, such as 40 vol.-% or more, e.g., from 40 to 75 vol.-%.

It has surprisingly been determined that the specific claimed form of titania, in terms of mean crystal size, size distribution, and particle size to crystal size ratio, gives improved opacity for film compositions. This has been evidenced in thin films using high concentrations of $TiO_2$ (30 vol.-% or more). The claimed larger crystal sizes and distributions, which move away from those in pigmentary products, have thus been found to be not only acceptable but in fact optimal for scattering visible light when provided in thin films with relatively high titania concentrations. Improvements of 10% in the opacity as compared to pigmentary $TiO_2$ have been observed.

An improvement of 10% in opacity is significant in this technical field. This difference can be enough to mean that substrates that previously were challenging to cover can be sufficiently covered. It can equally mean that the quantities of covering composition material are correspondingly decreased whilst maintaining the same degree of coverage. A reduction of even a few percent in raw materials can be valuable in terms of cost savings, as well as having potential environmental benefits.

According to one embodiment, the vehicle is, or comprises, a synthetic or natural resin. The resin may be, but is not limited to, a polyolefin resin, polyvinyl ester resin (including polyvinyl chloride resin, polyvinyl acetate resin, polyvinyl chloride acetate resin and polyvinyl butyral resin), ABS resin, polystyrene resin, methacrylic resin, polycarbonate resin, polyethylene terephthalate resin, polyamide resin, alkyd resin, acrylic resin, polyurethane resin, polyester resin, melamine resin, fluoropolymer, or epoxy resin. Cellulose derivatives may be contemplated, such as cellulose esters (nitrocellulose, cellulose acetate and the like), and especially cellulose ethers, for example, methylcellulose, hydroxyethylcellulose, hydroxypropylcellulose, propionitrile cellulose, ethyl cellulose and benzylcellulose. The corresponding derivatives of other polysaccharides can also be used.

In one embodiment, the vehicle is, or comprises, a carrier. The carrier may be, but is not limited to, an aqueous solvent, for example, water. The carrier may also be a non-aqueous solvent, for example, an organic solvent such as a petroleum distillate, alcohol, ketone, ester, glycol ether and the like. In one embodiment, the solvent may be selected from aliphatic alcohols (e.g., methanol or ethanol), ketones, aldehydes, ethers, esters, glycols, glycol ethers, hydrocarbon, and lactones.

In one embodiment, the vehicle is, or comprises, a binder. The binder may be, but is not limited to, a metal silicate binder, for example, an aluminosilicate binder. The binder may also be a polymeric binder, for example, an acrylic polymer or copolymer binder.

In one embodiment, the vehicle is a resin plus a carrier (e.g., a solvent) or a binder plus a carrier (e.g., a solvent).

The composition may further include one or more customary additives. Additives suitable for use include, but are not limited to, thickeners, stabilizers, emulsifiers, texturizers, adhesion promoters, UV stabilizers, de-glossing agents, dispersants, antifoaming agents, wetting agents, coalescing agents, and biocides/fungicides.

The composition may also include one or more spacer particles useful in spacing out or supporting material contained within the composition. The spacer particles may be silica, silicates, aluminates, sulfates, carbonates, clays, or polymeric particles in the form of hollow beads or in the form of microspheres.

The composition may be used as a coating composition, for example, as a paint, ink, liquid coating, powder coating, etc., or it may be used as a composition, for example, as a plastic or polymer molding composition, from which articles can be formed by molding, extrusion or other known processes.

In one embodiment, the composition is used in the form of a thin film. This may be in the form of a coating on a substrate or in the form of an independently formed article. The film formed from the composition has a thickness of 20 μm or less, such as 15 μm or less, or 10 μm or less, for example, 5 μm or less, e.g., 4 μm or less, or 3 μm or less, or 2 μm or less, or 1 μm or less. In one embodiment, the film is from 0.4 μm to 20 μm in thickness, such as from 0.4 μm to 15 μm or from 0.4 μm to 10 μm or from 0.4 μm to 5 μm. In one embodiment, the film is from 0.5 μm to 20 μm in thickness, such as from 0.5 μm to 15 μm or from 0.5 μm to 10 μm or from 0.5 μm to 5 μm.

The composition may in general be used in any type of application and applied to any one or more surfaces of a material or substrate. The composition may, for example, be an ink, a coating (e.g., a primer coating), a plastic (e.g., a thin plastic film), a paint, a varnish, or a rubber.

Potential substrates and their surfaces to which the composition of this disclosure may be applied (by any known means) are unlimited and include any substrate or surface that may be coated, including, but not limited to, paper, cardboard and plastic packaging, including packaging for foodstuffs, metal components including metal coils, a building surface, an automobile, a water tower, a portable container, a road surface, a textile, an aircraft, a boat, a ship, other types of water craft, a window profile, siding, a sign, furniture, fencing, decking, and railings.

The present invention provides a product which comprises a substrate that is at least partially covered with a composition of the present invention or a thin film of the present invention. It may be that the composition or film is an ink, a primer coating or a plastic film, and thus in one embodiment the product comprises a substrate that is at least partially covered with an ink, a primer coating or a plastic film. For example, the product may have an outer surface and that outer surface may be partially, mostly or completely covered with an ink, a primer coating or a plastic film.

The disclosed embodiments find particular application in inks (such as printing inks and security inks), paints, primer coatings for metal (such as in coil coating processes) and thin plastic films (e.g., for packaging).

However, the disclosed embodiments may also be utilized in other applications where pigmentary titania is commonly utilized, e.g., white solar reflective coatings, plastic components and roof shingle applications.

EXAMPLES

Embodiments of the present disclosure will now be further described, in a non-limiting manner, by reference to the following examples.

Example 1

Image analysis of electron micrographs was carried out in relation to 140 conventional pigmentary titania materials to establish their crystal size and geometric weight standard deviation (GWSD). The minimum, maximum and mean was determined.

Image analysis was also carried out in relation to three commercially available large crystal titania products. Their crystal size and geometric standard deviation was recorded.

Table 1 shows the results of the image analysis.

TABLE 1

|  | Mean crystal size (μm) | Geometric weight standard deviation (GWSD) |
|---|---|---|
| Conventional pigmentary titania - maximum value for tested materials | 0.33 | 1.51 |
| Conventional pigmentary titania - mean value for tested materials | 0.23 | 1.30 |
| Conventional pigmentary titania - minimum value for tested materials | 0.18 | 1.24 |
| Large crystal titania - product A | 0.95 | 1.27 |
| Large crystal titania - product B | 0.77 | 1.40 |
| Large crystal titania - product C | 0.75 | 1.46 |

Calculations were then made as to the crystal size distributions for products having various values for mean crystal size and geometric weight standard deviation, based on the materials having a lognormal distribution. The values taken for the mean crystal size and geometric weight standard deviation were intended to be illustrative rather than to directly reflect a single prior art product.

Table 2 shows, based on the mean crystal size and the geometric weight standard deviation, the difference in the distribution of crystals within the material.

TABLE 2

| Material | Mean crystal size (μm) | GWSD | Wt.-% 0.2-0.3 μm | Wt.-% 0.3-0.5 μm | Wt.-% ≤0.5 μm |
|---|---|---|---|---|---|
| Conventional | 0.25 | 1.25 | 63.44 | 20.60 | 99.91 |
| pigmentary | 0.25 | 1.31 | 54.59 | 24.45 | 99.49 |
| TiO$_2$ | 0.25 | 1.40 | 45.24 | 27.43 | 98.03 |
| Inventive | 0.40 | 1.25 | 9.77 | 74.27 | 84.13 |
| TiO$_2$ | 0.40 | 1.31 | 13.82 | 65.24 | 79.57 |
|  | 0.40 | 1.40 | 17.66 | 55.01 | 74.64 |
| Inventive | 0.48 | 1.25 | 1.75 | 55.50 | 57.26 |
| TiO$_2$ | 0.48 | 1.31 | 4.03 | 51.92 | 56.01 |
|  | 0.48 | 1.40 | 7.66 | 46.71 | 54.83 |
| Large crystal | 0.70 | 1.25 | 0.01 | 6.57 | 6.58 |
| TiO$_2$ | 0.70 | 1.31 | 0.08 | 10.55 | 10.64 |
|  | 0.70 | 1.40 | 0.58 | 15.28 | 15.87 |
| Large crystal | 1.00 | 1.25 | 0.00 | 0.09 | 0.09 |
| TiO$_2$ | 1.00 | 1.31 | 0.00 | 0.51 | 0.51 |
| (Product A) | 1.00 | 1.40 | 0.02 | 1.95 | 1.97 |

It can therefore be appreciated that the material used in the present invention has a distinct crystal distribution as compared to both conventional pigmentary titania and as compared to commercial large crystal titania.

Example 2

TiO$_2$ particles with a mean crystal size of 0.397 μm and 0.386 μm, respectively, were prepared and tested in white inks.

Method

Rutile titanium dioxide materials were produced using the sulfate process (Blumenfeld variant). Conventional processing was conducted at the ore milling, digestion, clarification, precipitation and leaching stages. Since the aim was to produce a larger crystal size than is conventional, the metatitanic acid pulp from leaching was additioned with 1.00% of Blumenfeld rutile nuclei (produced from sodium titanate). The nucleated material was further additionated with 0.10% $Al_2O_3$ (as aluminum sulfate) and with 0.2% $K_2O$ (as potassium sulfate). The resulting material was calcined to a temperature of 960° C. over a period of about 12 hours.

The calciner discharge was crushed, dispersed and sand-milled to a particle size of about 0.45 μm and then coated with 2.7% dense silica and 2.4% alumina.

The coated material was filtered, washed, dried and jet-milled with around 0.2% trimethylol propane to produce a fine white powder.

Two materials were obtained, which are referenced as "/30" and "/40". Properties of these titanium dioxide materials are set out in Table 3 below.

TABLE 3

|  | /30 | /40 |
|---|---|---|
| Mean crystal size (μm) | 0.397 | 0.386 |
| GWSD | 1.31 | 1.32 |
| Wt.-% 0.2-0.3 μm | 14.42 | 17.30 |
| Wt.-% 0.3-0.5 μm | 65.4 | 64.2 |
| Particle size: crystal size | 1.12 | 1.18 |

A white ink was prepared from each coated titania.

Comparative white inks were also prepared using two standard pigments: RDI-S and RDE2. These are recognized in the pigments industry and are manufactured by Huntsman P&A UK Limited. Both have a base crystal with a mean size of 0.24 μm that is subsequently coated.

The inks were prepared as follows:
Starting Solutions
  Solution 1 was prepared by dissolving 298 g Mowital® B20H (low viscosity polyvinyl butyral resin, available from Kuraray Specialities Europe) in 1192 g propan-1-ol.
  Solution 2 was prepared by diluting 700 g of Solution 1 using 700 g propan-1-ol.
Millbase
  207 g $TiO_2$ pigment was hand stirred into 70 g of Solution 2. The resulting mixture was covered and dispersed for 5 minutes on a high speed impeller mill, equipped with a 40 mm blade, at 5000 rpm. A further 65 g of Solution 2 was then added, and then a further 2 minutes of mixing was conducted at a reduced speed of 2000 rpm.
Ink
  207 g of Millbase was added to 168 g of Solution 1. The resulting mixture was dispersed in a high speed impeller mill for two minutes at 2000 rpm.
Letdown
  The viscosity of the ink was adjusted to be suitable for printing. The viscosity is quantified as the time (seconds) taken for a known volume to pass through a flow cup orifice. A viscosity of 25 seconds on a Zahn2 cup at room temperature was used in all cases. Solvent was added to adjust the viscosity, with the actual volume required varying from sample to sample.
Drawdowns
  Inks were drawn down using a series of wire wound applicators in order to achieve a range of film thicknesses. Applicators were used which applied wet film thicknesses of 6, 12 and 24 μm. The solids contents of the inks were all about 14%, so that the actual thicknesses were 0.8, 1.7 and 3.4 μm.
Spectra
  Reflectance over black at different film thicknesses, and transmittance over a range of wavelengths, were measured. In this regard, spectra were measured in reflectance and transmittance mode using a Cary 5000 Spectrometer.
Results
  FIG. 1 shows the reflectance over black for the four tested inks over a range of film thicknesses.

It can be seen that the inks based on the products of the present disclosure ('/30' and '/40') have higher opacity than the inks based on conventional titania at each tested thickness.

Table 4 below indicates the Y(B) opacity values for the tested materials at three of the different film thicknesses. It can be seen that in each case, the Y(B) value is greatest for the film in accordance with the present invention, i.e., the films of the present invention have greater opacity than the commercial products.

TABLE 4

|  | Film Thickness (μm) | | |
|---|---|---|---|
|  | 0.84 | 1.67 | 3.34 |
| RDE2 | 46.64 | 51.76 | 59.14 |
| RDI-S | 46.16 | 51.54 | 58.20 |
| Sample/30 | 46.90 | 52.12 | 59.20 |
| Sample/40 | 47.08 | 52.57 | 59.52 |

The benefit of the disclosed embodiments can also be quantified by examining the thickness needed for each ink to achieve a set level of opacity.

Table 5 below shows the thickness of film required to achieve a Y(B) of 55% for each product:

TABLE 5

| Product | Film thickness required (μm) |
|---|---|
| RDE2 | 2.38 |
| RDI-S | 2.49 |
| Sample/30 | 2.33 |
| Sample/40 | 2.23 |

Sample /40 therefore provides a 10.4% improvement over the commercial product RDI-S.

It is therefore apparent that the materials according to the present invention deliver improved opacity over commercial products in the marketplace.

FIG. 2 shows the transmittance for each of the four tested inks over a range of wavelengths.

It can be seen that:
For products /30 and /40, the transmittance is lower than for the conventional products in the visible (on average) and in the NIR.
For products /30 and /40, the inks have a blue transmittance (conventional inks have red transmittance).
For products /30 and /40, the transmittance in the UV region (<400 nm) is high as compared to conventional products, with the results indicating about fourfold transmittance in the UV region for the product of the present invention relative to the products of the art.

FIG. 3 shows the reflectance over black for the four tested inks over a range of film thicknesses, but with the values for the two samples according to the present invention (/30 and /40) having been averaged and being shown as a single line labelled "Exptal". It can be seen that this line consistently runs above the lines for the two inks based on conventional titania products over the range of film thicknesses tested. This provides clear evidence that there is enhanced opacity achieved by the present invention and that the conventional wisdom that the optimal crystal size is around 0.25 µm is incorrect in thin film products.

Example 3

TiO$_2$ particles with a mean crystal size of 0.28, 0.32 and 0.36 µm, respectively, were prepared and tested in alkyd paints.

Method

A quantity of metatitanic acid from the sulfate process was divided into three portions. These were additioned with 1.88%, 1.26% and 0.89% rutile nuclei, respectively.

Each portion was also treated with 0.07% Al$_2$O$_3$ (as aluminum sulfate), 0.20% K$_2$O (as potassium sulfate) and 0.20% P$_2$O$_5$ (as mono-ammonium phosphate).

The three portions were each individually calcined with temperature increasing at 1° C./minute until a rutile content >99% was measured. The calcination was stopped at that point.

The three portions had titania with mean crystal sizes of 0.28, 0.32 and 0.36 µm, respectively.

Properties of these titanium dioxide materials are set out in Table 6 below:

TABLE 6

|  | Mean crystal size (µm) | Wt.-% 0.2-0.3 µm | Wt.-% 0.3-0.5 µm | GWSD |
|---|---|---|---|---|
| Comparative | 0.28 | 51.36 | 38.18 | 1.29 |
| Invention | 0.32 | 36.62 | 55.27 | 1.30 |
| Invention | 0.36 | 22.65 | 66.45 | 1.29 |

Each of the three calciner discharges was then milled to three different particle sizes detailed in Table 7 below:

TABLE 7

| Crystal size (µm) | Particle size 1 (µm) | Particle size: crystal size | Particle size 2 (µm) | Particle size: crystal size | Particle size 3 (µm) | Particle size: crystal size |
|---|---|---|---|---|---|---|
| 0.28 | 0.3 | 1.07 | 0.32 | 1.14 | 0.34 | 1.21 |
| 0.32 | 0.34 | 1.06 | 0.36 | 1.13 | 0.37 | 1.16 |
| 0.36 | 0.37 | 1.03 | 0.38 | 1.06 | 0.40 | 1.11 |

Each of the nine resulting slurries was then additioned with 1.25% aluminum sulfate and then 1.25% sodium aluminate, with the outcome that a 2.5% coating of aluminum oxyhydroxides was applied. Residual sulfate was removed by curing the coating at pH 10.5, after which the coating was neutralized in all cases.

The slurries were each then filtered, washed and dried, before being jet-milled with 0.4% trimethylol propane (wt/wt on TiO$_2$).

Table 8 below details the particle sizes measured in microns (µm) on the dry powder products. The slight growth in each case results from the agglomeration associated with applying an inorganic coating.

TABLE 8

| Crystal Size | Sandmilled Size | Final Pigment Size |
|---|---|---|
| 0.28 | 0.302 | 0.309 |
| 0.28 | 0.316 | 0.319 |
| 0.28 | 0.344 | 0.347 |
| 0.32 | 0.342 | 0.349 |

TABLE 8-continued

| Crystal Size | Sandmilled Size | Final Pigment Size |
|---|---|---|
| 0.32 | 0.358 | 0.363 |
| 0.32 | 0.367 | 0.365 |
| 0.36 | 0.37 | 0.386 |
| 0.36 | 0.38 | 0.392 |
| 0.36 | 0.399 | 0.406 |

Each of these powders was incorporated into an alkyd paint, with the concentration of pigment in the dry paint being 35 vol.-%.

In this regard, alkyd paint films were prepared using an air-drying alkyd resin (Sobral P470) at high loading (35% pigment by dry volume).

The paints were drawn down onto Melinex® transparent polyester films. Green reflectance (CIE D65, 10° observer) was measured over a black tile.

Results

Figure 4:
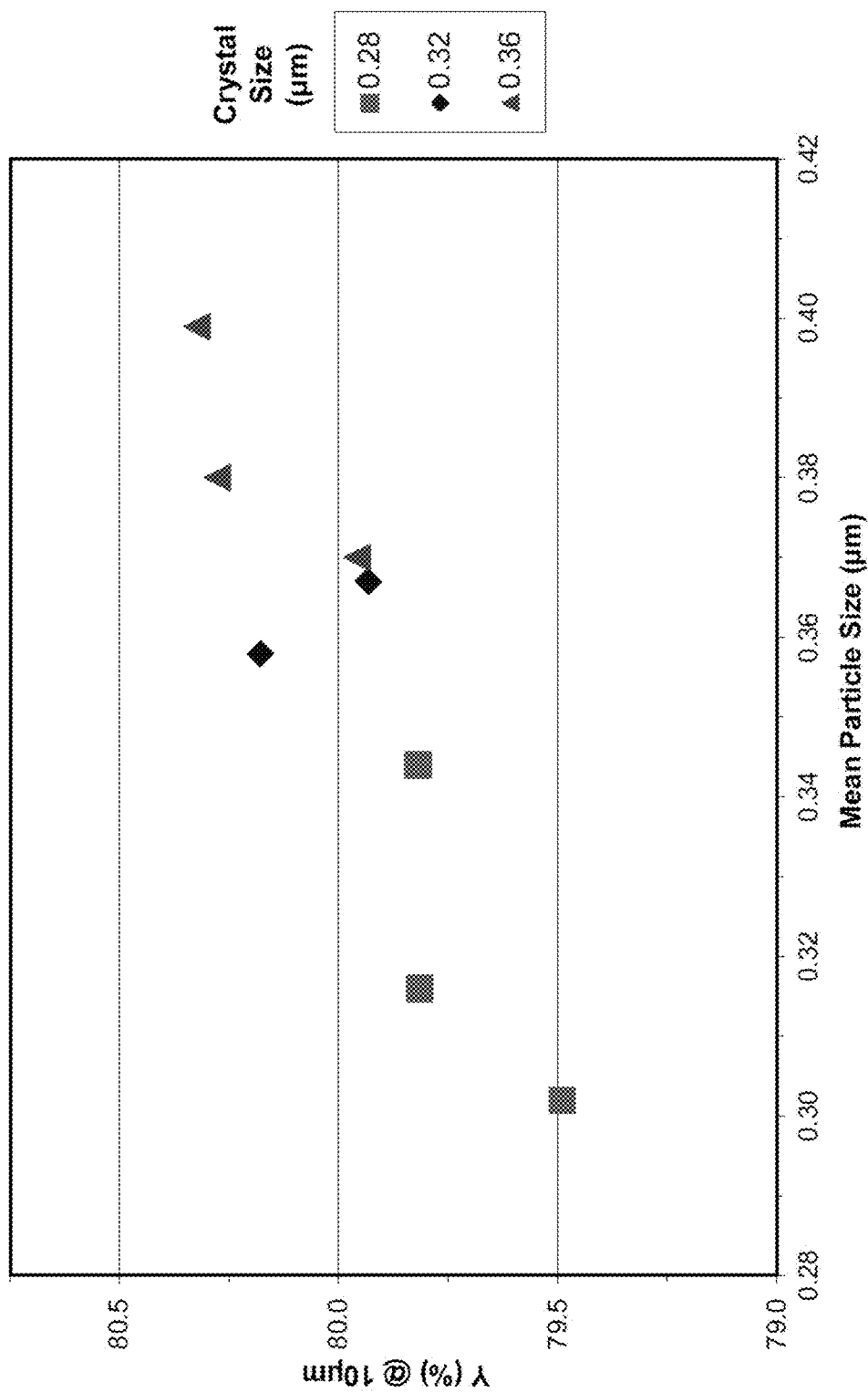
FIG. 4 is a graph showing the Y(B) (reflectance over black) results at 10 µm film thickness for alkyd paint films containing titania particle material with different crystal sizes.

The Y(B) (reflectance over black) results for each of the tested paint films are shown in FIG. 4.

It can be seen that the best opacity results were achieved with the products based on the 0.36 µm sized crystal product, i.e., away from the conventional wisdom that the optimal crystal size is around 0.25 µm.

Good results were also achieved for the 0.32 µm sized crystal product.

Therefore both materials according to the present invention have opacity properties that would allow them to be used in applications such as printing inks, primer coatings for metal (such as in coil coating processes) and plastic films (e.g., for packaging, and especially food packaging), where it is required that the thickness of the product is kept low.

Example 4

TiO$_2$ particles with a mean crystal size of 0.23, 0.25 and 0.40 µm, respectively, were tested in polyvinyl butyral inks.

Method

Polyvinyl butyral inks were produced in a four step synthesis involving:
Making a first milling solution;
Using some of the first milling solution to produce a second milling solution;
Forming a millbase from TiO$_2$ and the second milling solution; and
Forming inks from the millbase and the first milling solution.

The three TiO$_2$ products tested were:
A. Standard pigment: SACHTLEBEN® RDI-S. This is alumina-surface treated rutile titanium dioxide pigment available from Venator Materials Corp.
B. Commercial product: Tronox® R-KB-2. This is micronized rutile titanium dioxide pigment, coated with an aluminum and silicon compound, available from Venator Materials Corp.

C. Product according to the present invention. This is silica and alumina-surface treated rutile titanium dioxide pigment. This TiO$_2$ product was produced according to the same method as set out in Example 2.

The characteristics of the TiO$_2$ products were tested. The mean crystal size was determined by transmission electron microscopy (TEM) on a rubbed out sample with image analysis of the resulting photograph. The crystal size distribution was also determined by image analysis of electron micrographs of the crystals. The mean particle size of the titanium dioxide was determined by X-ray sedimentation and the mean particle size: mean crystal size ratio calculated.

The results are set out in Table 9 below.

TABLE 9

|  | A | B | C |
|---|---|---|---|
| Mean crystal size (μm) | 0.23 | 0.25 | 0.40 |
| Wt % of crystals sized 0.3 to 0.5 μm | 11.72 | 27.37 | 66.35 |
| Mean particle size: mean crystal size | 1.17 | 1.46 | 1.17 |

Method

Milling Solution 1

298 g of Mowital® B20H (low viscosity polyvinyl butyral resin, available from Kuraray Specialities Europe) was added to 1192 g propan-1-ol in a 2 liter jar.

300 g of glass ballotini were added and the jar lidded and sealed with tape, before being trundled for 24 hours, to give Milling Solution 1.

Milling Solution 2

700 g of Milling Solution 1 was added to 700 g propan-1-ol in a 2 liter jar.

300 g of glass ballotini were added and the jar lidded and sealed with tape, before being trundled for 24 hours, to give Milling Solution 2.

Millbase 207 g of TiO$_2$ was hand-stirred into 70 g of Milling Solution 2. This was done for each of the three titanium dioxide pigments A, B and C being tested.

The resulting slurry was in each case covered and then dispersed at 5000 rpm using a high speed impeller mill with a 40 mm blade.

A further 65 g of Milling Solution 2 was in each case added and stirred at 2000 rpm for 2 minutes, to arrive at a stabilized Millbase.

Inks

Inks were prepared at two concentrations for each of the three titanium dioxide pigments A, B and C being tested. In each case, a weight of Milling Solution 1 was added to 207 g of the Millbase, to dilute the Millbase to achieve the desired concentration of TiO$_2$, as shown in Table 10.

TABLE 10

| Concentration | Quantity of Milling Solution 1 added to Millbase |
|---|---|
| 50% (i.e.; 50% TiO$_2$, by volume, in the applied ink film) | 129.29 g |
| 55%: (i.e.; 55% TiO$_2$, by volume, in the applied ink film) | 98.35 g |

Testing

Each of the six inks as formulated was milled in a high speed impeller mill for 2 minutes at 2000 rpm.

i) Surface Film

Each ink was drawn down using a No. 2 close bound applicator (K-bar) to achieve a wet film thickness of 12 μm, over a black background.

The opacity of each of the six white films was measured as the reflectance over black ($Y_B$) of the white film over the black background.

ii) Laminated Film

For reverse laminate inks, processing involves forcing resin into the pores of the ink, which reduces the opacity.

A clear long-oil air-drying alkyd was therefore applied onto each of the films from i), again using a No. 2 K-bar.

The opacity of each of the six white films was then measured again, as the reflectance over black ($Y_B$) of the white film over the black background.

Results

The reflectance over black ($Y_B$) values as measured for each of the films is set out in Table 11:

TABLE 11

|  | Surface Film | | Laminated Film | |
|---|---|---|---|---|
| TiO$_2$ | 50 vol.-% | 55 vol.-% | 50 vol.-% | 55 vol.-% |
| A | 57.89 | 58.05 | 56.75 | 57.09 |
| B | 58.15 | 58.46 | 57.21 | 57.43 |
| C | 59.03 | 59.45 | 57.86 | 57.91 |

It can be seen that for both the standard surface film and the laminated film, the product according to the present invention had a higher reflectance over black ($Y_B$) at a 50% concentration than the standard/commercial prior art products achieved at a 55% loading.

A lower concentration of TiO$_2$ can therefore be used whilst still achieving a better opacity.

The thin film product according to the present invention thus clearly has an improved opacity as compared to thin film products where the size criteria for the titania are not met.

Example 5

TiO$_2$ particles with a mean crystal size of 0.23, 0.25 and 0.40 μm, respectively, were tested in UV curing inks.

Method

UV curing inks were prepared as follows using each of three titanium dioxide pigments. These titania pigments A, B and C were the same as used in Example 4.

Initiator Solution 10 g of Diphenyl(2,4,6-trimethylbenzoyl)phosphine oxide was additioned with 12.22 g of Diethylene glycol monoethyl ether in a beaker which was loosely covered and heated (in an oven) to 120° C., to effect dissolution. The solution was then cooled to room temperature.

To this cooled solution (22.22 g) was added 14.81 g of 1-Hydroxycyclohexylphenylketone. This mixture was covered loosely and heated to 80° C. to drive dissolution, before being cooled to room temperature, to obtain an Initiator Solution.

UV Curable White Topcoat

A first mixture was formed by mixing the following components in a 20 ml pot:

3.57 g Neorad™ U-25-20D Aliphatic Urethane Acrylate (from DSM Coating Resins LLC)

1.19 g Agisyn™ 230-A2 Aliphatic Urethane Acrylate Oligomer (from DSM Coating Resins LLC)

5.00 g TiO$_2$ Pigment (A, B or C)

This first mixture was milled on a Speedmixer™ (Flacktek Inc.) at 2500 rpm for 150 seconds.

A second mixture was formed by mixing the following components in a 20 ml pot:

1.98 g Agisyn™ 2811 (Trimylol propyl acrylate from DSM Coating Resins LLC)

3.97 g Agisyn™ 2833 (Dipropyleneglycolate diacrylate from DSM Coating Resins LLC)

0.26 g Agisyn™ 008 (Reactive amine additive from DSM Coating Resins LLC)

This second mixture was milled on a Speedmixer™ (Flacktek Inc.) at 2500 rpm for 120 seconds.

The first mixture and the second mixture were then combined in a pot together with 0.66 g of the Initiator Solution. This combined mixture was milled on a Speedmixer™ (Flacktek Inc.) at 2500 rpm for 30 seconds to produce a liquid coating.

Such a liquid coating was prepared for each the three titania pigments A, B and C.

The liquid coatings were drawn down onto card using a No. 6 'k-bar' wire wound applicator, to give films of nominal thickness 60 μm (in all three cases).

The uncured films were passed through a Beltron® BE20 UV-IR laboratory dryer equipped with mercury and gallium lamps, each with intensity 120 W/cm, at a speed of 6 meters/minute.

The extent of cure was tested using a test solution comprising 1.5 g of 1% KMnO$_4$ in aqueous solution. This test solution was rubbed over an area 2.5 cm×2.5 cm on each film and left in place for 300 seconds, before being rinsed off with cold water.

In the art, discoloration of the film is used as a test of residual unsaturation (double bonds) and is a measure of the success of the curing process. Lower discoloration signifies a more satisfactory cure.

Results

Figure 5:
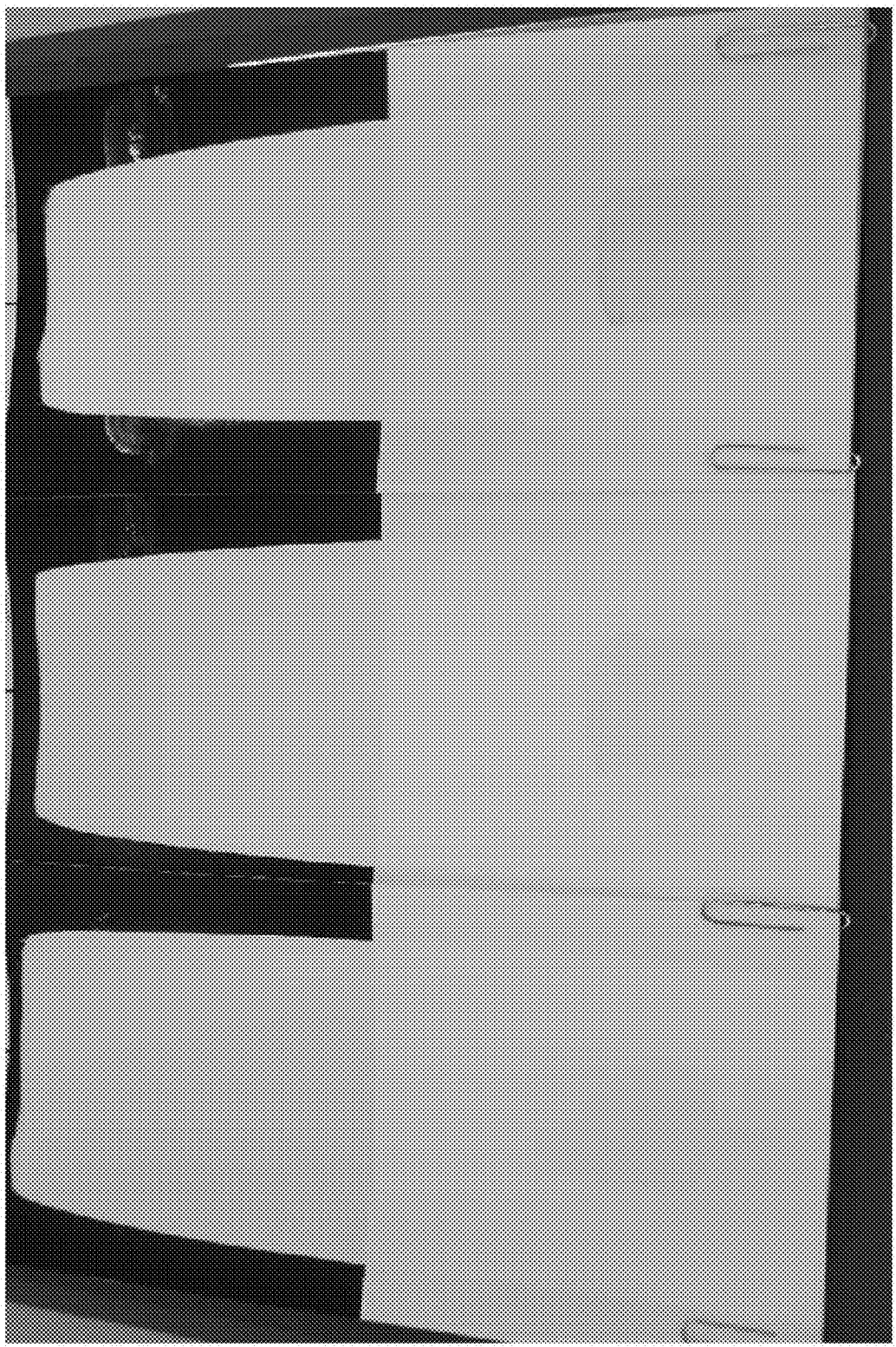
FIG. 5 is a photo showing UV cured inks containing titania particle material with different crystal sizes, where the cured inks have been treated with potassium permanganate, such that lower discoloration signifies a more satisfactory cure.

A photo of the tested panels is shown in FIG. 5. Panel C is on the left; Panel B is in the middle, and Panel A is on the right.

It can be seen that Panel C has the least discoloration, i.e., it has been more completely cured by the UV treatment than the other two panels.

Discoloration of this type is characterized by changes (Δ) in the three color dimensions: L*(whiteness), a* (redness) and b* (yellowness). The net distance in perceptual color space (discoloration) is often summarized as ΔE*.

The values for the three cured test films are set out in Table 12:

TABLE 12

|   | ΔL* | Δa* | Δb* | ΔE* |
|---|---|---|---|---|
| A | −2.68 | 0.25 | 5.78 | 6.38 |
| B | −2.30 | 0.18 | 5.18 | 5.67 |
| C | −1.34 | 0.01 | 3.39 | 3.65 |

The measured values therefore confirm what can be seen in the photo: there is less discoloration for the film according to the present invention, which shows that it has been more completely cured by the UV treatment than the other two films using commercial/standard titania.

The present invention is not limited to embodiments described herein; reference should be had to the appended claims.

What is claimed is:

1. A pigmentary particulate material selected from the group consisting of titanium dioxide, doped titanium dioxide, and a mixture of titanium dioxide and doped titanium dioxide, the pigmentary particulate material comprising:
 a mean crystal size of from 0.35 to 0.5 μm;
 a crystal size distribution such that ≥40 wt.-% of the pigmentary particulate material has a crystal size of from 0.3 to 0.5 μm; and
 a ratio of a mean particle size to the mean crystal size of ≤1.25.

2. A composition comprising the pigmentary particulate material as recited in claim 1 dispersed within a vehicle.

3. The composition as recited in claim 2, wherein the pigmentary particulate material is present in an amount of ≥30 vol.-%.

4. The composition as recited in claim 3, wherein the amount is from 40 to 75 vol.-%.

5. A film formed from the composition as recited in claim 2, wherein the film comprises a thickness of ≤20 μm.

6. The film as recited in claim 5, wherein the thickness is ≤15 μm.

7. A product comprising a substrate which is at least partially covered with,
 a composition comprising the pigmentary particulate material as recited in claim 1 dispersed within a vehicle, or with
 a film formed from the composition, the film comprising a thickness of ≤20 μm.

8. The product as recited in claim 7, wherein the composition or the film is an ink, a primer coating or a plastic film.

9. The product as recited in claim 7, wherein the substrate comprises a reflective surface.

10. A method of using the pigmentary particulate material as recited in claim 1 in an ink, a paint, a primer coating for a metal, or a plastic film, the method comprising:
 providing the pigmentary particulate material as recited in claim 1;
 incorporating the pigmentary particulate material in the ink, the paint, the primer coating for the metal, or the plastic film; and
 applying the ink, the paint, the primer coating for the metal, or the plastic film to a substrate.

11. The method of using as recited in claim 10, wherein the ink is at least one of a printing ink, a security ink, and a UV-curable ink.

12. A method of using the pigmentary particulate material as recited in claim 1 as a pigmentary material in a composition so as to provide at least one of an improved opacity, to lower a concentration of the pigmentary material without adversely affecting an opacity of the composition, and to permit a smaller thickness of the composition to be used as a coating on a substrate without adversely affecting an opacity of the composition, the method comprising:
 providing a vehicle; and
 dispersing the pigmentary particulate material in the vehicle to provide the composition.

13. A method of using the pigmentary particulate material as recited in claim 1 as a pigmentary material in a composition, the method comprising:
 providing a vehicle; and
 dispersing the pigmentary particulate material in the vehicle to provide the composition,
 wherein, the composition comprises a Y(B) opacity value of ≥55% with a composition thickness of ≤3 μm.

14. The pigmentary particulate material as recited in claim 1, wherein the mean crystal size is from 0.35 to 0.5 μm.

15. The pigmentary particulate material as recited in claim 1, wherein the crystal size distribution is such that ≥50 wt.-% of the pigmentary particulate material has a crystal size of 0.3 to 0.5 μm.

16. The pigmentary particulate material as recited in claim 1, wherein the crystal size distribution is such that ≥45 wt.-% of the pigmentary particulate material has a crystal size of ≤0.5 μm.

17. The pigmentary particulate material as recited in claim 1, wherein the crystal size distribution is such that 0.5 to 40 wt.-% of the pigmentary particulate material has a crystal size of 0.2 to 0.3 μm.

18. The pigmentary particulate material as recited in claim 1, wherein the ratio of the mean particle size to the mean crystal size is ≤1.2.

19. The pigmentary particulate material as recited in claim 18, wherein the ratio of the mean particle size to the mean crystal size is 0.8 to 1.2.

20. The pigmentary particulate material as recited in claim 19, wherein the ratio of the mean particle size to the mean crystal size is 1.0 to 1.15.

\* \* \* \* \*